(12) United States Patent
Kim

(10) Patent No.: US 8,348,302 B2
(45) Date of Patent: Jan. 8, 2013

(54) AIRBAG MODULE

(75) Inventor: Yeon Kyung Kim, Seoul (KR)

(73) Assignee: Hyundai Mobis Co., Ltd., Yongin-si, Gyeonggi-do (KR)

( * ) Notice: Subject to any disclaimer, the term of this patent is extended or adjusted under 35 U.S.C. 154(b) by 116 days.

(21) Appl. No.: 13/012,511

(22) Filed: Jan. 24, 2011

(65) Prior Publication Data

US 2012/0001405 A1 Jan. 5, 2012

(30) Foreign Application Priority Data

Jul. 2, 2010 (KR) .................. 10-2010-0063884

(51) Int. Cl.
*B60R 21/16* (2006.01)

(52) U.S. Cl. .................................... 280/728.2

(58) Field of Classification Search ............. 280/728.2, 280/728.3, 743.1
See application file for complete search history.

(56) References Cited

U.S. PATENT DOCUMENTS

| | | | |
|---|---|---|---|
| 5,520,409 A | 5/1996 | Saderholm | |
| 6,371,510 B1 * | 4/2002 | Marriott et al. | 280/730.1 |
| 7,195,273 B2 * | 3/2007 | Lewis et al. | 280/728.2 |
| 7,213,837 B2 * | 5/2007 | Clarke et al. | 280/731 |
| 7,478,826 B2 * | 1/2009 | Soderquist et al. | 280/728.2 |
| 7,695,013 B2 * | 4/2010 | Kakstis et al. | 280/743.1 |
| 2008/0154065 A1 | 6/2008 | Katsumi | |
| 2009/0033070 A1 | 2/2009 | Dumbrique | |
| 2009/0079167 A1 | 3/2009 | Shimazaki et al. | |

FOREIGN PATENT DOCUMENTS

| | | |
|---|---|---|
| JP | 06-206511 | 7/1994 |
| JP | 06206511 A | 8/2006 |
| KR | 20080023337 A | 3/2008 |
| WO | WO 2009/017858 | 2/2009 |
| WO | WO2009017858 A1 | 2/2009 |

* cited by examiner

*Primary Examiner* — Faye M. Fleming
(74) *Attorney, Agent, or Firm* — Sherr & Jian, PLLC

(57) ABSTRACT

Disclosed is an airbag module for an automobile. The airbag module includes: an airbag cushion inflated and developed by an inflow gas; an airbag housing having a cushion inlet through which the airbag cushion is inserted, accommodating the airbag cushion inserted through the cushion inlet, and made of a flexible material; and a cushion cover combined with the airbag housing to cover the cushion inlet and made of a flexible material. The airbag module also includes a reinforcing member attached around the airbag housing such that the airbag housing withstands the inflation pressure of the airbag cushion. The airbag module further includes a mounting member, made of a flexible material, combined with the airbag housing to be mounted in a vehicle and restraining movement of the airbag housing due to development pressure of the airbag cushion.

12 Claims, 5 Drawing Sheets

AIRBAG MODULE

CROSS-REFERENCE TO RELATED APPLICATIONS

The present application claims priority to Korean Patent Application Number 10-2010-0063884 filed Jul. 2, 2010, the entire contents of which application is incorporated herein for all purposes by this reference.

BACKGROUND OF THE INVENTION

1. Field of the Invention

The present invention relates to an airbag module, and more particularly, to an airbag module in which an airbag housing having a cushion inlet is made of a flexible material, an airbag cushion is accommodated in the airbag housing through the cushion inlet, and a cushion cover made of a flexible material is connected to the airbag housing to cover the cushion inlet.

2. Description of the Related Art

In general, a vehicle is equipped with airbag module to prevent a passenger from being hurt due to direct hitting to a structure of the vehicle in an accident.

The airbag module includes an inflator generating a gas, an airbag cushion connected with the inflator and inflated and developed by the inflow gas to protect the passenger, and an airbag housing accommodating the airbag cushion and mounted in the vehicle.

The airbag housing is made of steel or plastic to withstand inflation pressure and development pressure of the airbag cushion and mounted in the vehicle.

Further, the airbag cushion is folded in the airbag housing, that is, the airbag cushion is folded several times and sealed in a cushion package with a cushion cover in order not to develop, and then the cushion package is accommodated in the airbag housing.

SUMMARY OF THE INVENTION

The present invention has been made in effort to provide an airbag module in which an airbag housing having a cushion inlet is made of a flexible material, an airbag cushion is accommodated in the airbag housing through the cushion inlet, and a cushion cover made of a flexible material is connected to the airbag housing to cover the cushion inlet.

The objects of the present invention are not limited to the object described above, and the other objects not stated in the above will be clearly understood by those skilled in the art from the following description.

An exemplary embodiment of the present invention provides an airbag module includes: an airbag cushion inflated and developed by an inflow gas; an airbag housing having a cushion inlet through which the airbag cushion is inserted, accommodating the airbag cushion inserted through the cushion inlet, and made of a flexible material; and a cushion cover combined with the airbag housing to cover the cushion inlet and made of a flexible material.

The details of other exemplary embodiments are included in the detailed description and the drawings.

According to the exemplary embodiment of the present invention, the airbag module has an effect in reducing the weight while allowing easy change in design, because the airbag housing is made of a flexible material.

Further, it has an effect in easily maintaining the parts and simplifying the assembly process, because the airbag housing and the cushion cover are integrated.

The effects of the present invention are not limited to the effects described above, and the other effects not stated in the above will be clearly understood by those skilled in the art from the claims.

DETAILED DESCRIPTION OF THE EMBODIMENTS

Figure 1:
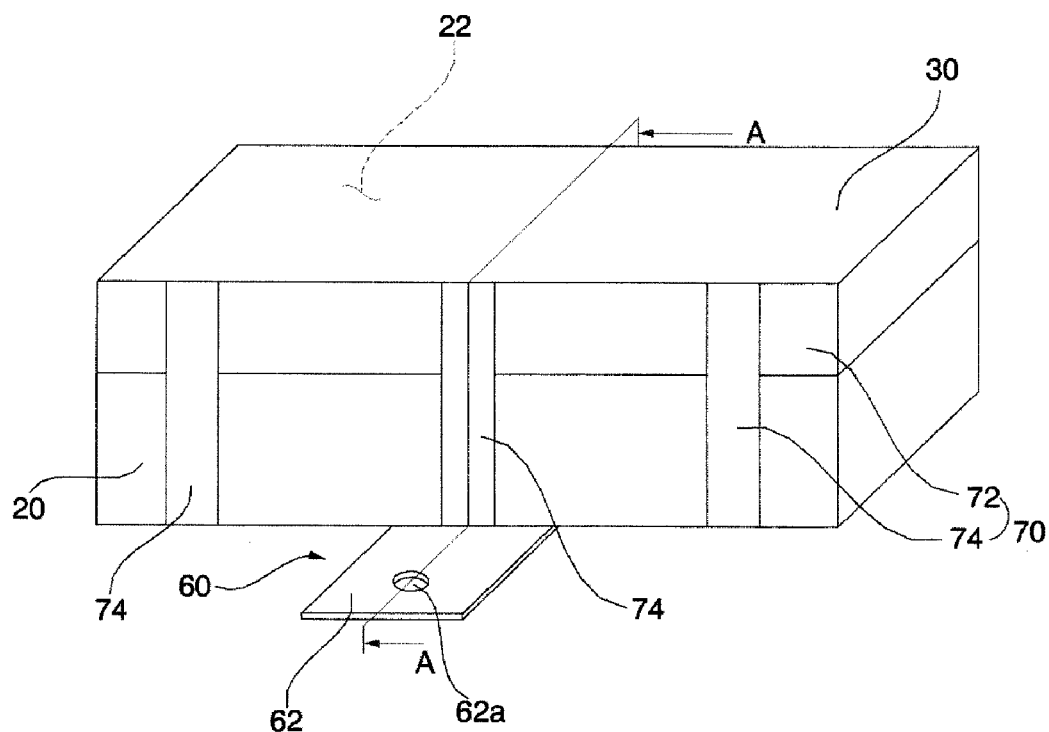
FIG. 1 is a perspective view of an airbag module according to an exemplary embodiment of the present invention.

Advantages and features of the present invention and methods for achieving them will be made clear from exemplary embodiments described below in detail with reference to the accompanying drawings. However, the present invention is not limited to exemplary embodiments described herein and will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. Like reference numerals designate like components throughout the specification An airbag module according to an exemplary embodiment of the present invention is described hereafter with reference to the accompanying drawings. The airbag module shown in the figures is a passenger airbag module as an example, and integrally forming a cushion 30 with an airbag housing 20 made of a flexible material is the subject of the present invention and may be applied to other airbag modules, including a driver airbag module, a knee airbag module, a side airbag module, and a curtain airbag module, which will be clearly understood by those skilled in the art from the following description.

Figure 2:
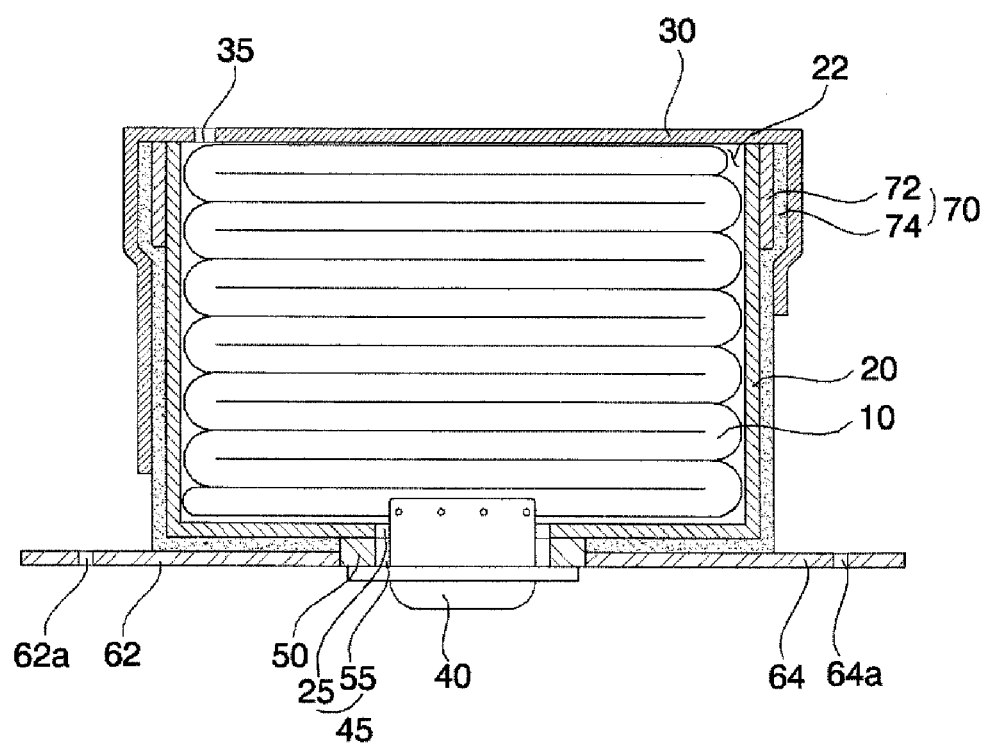
FIG. 2 is a cross-sectional view taken along the line A-A of FIG. 1.
Figure 3:
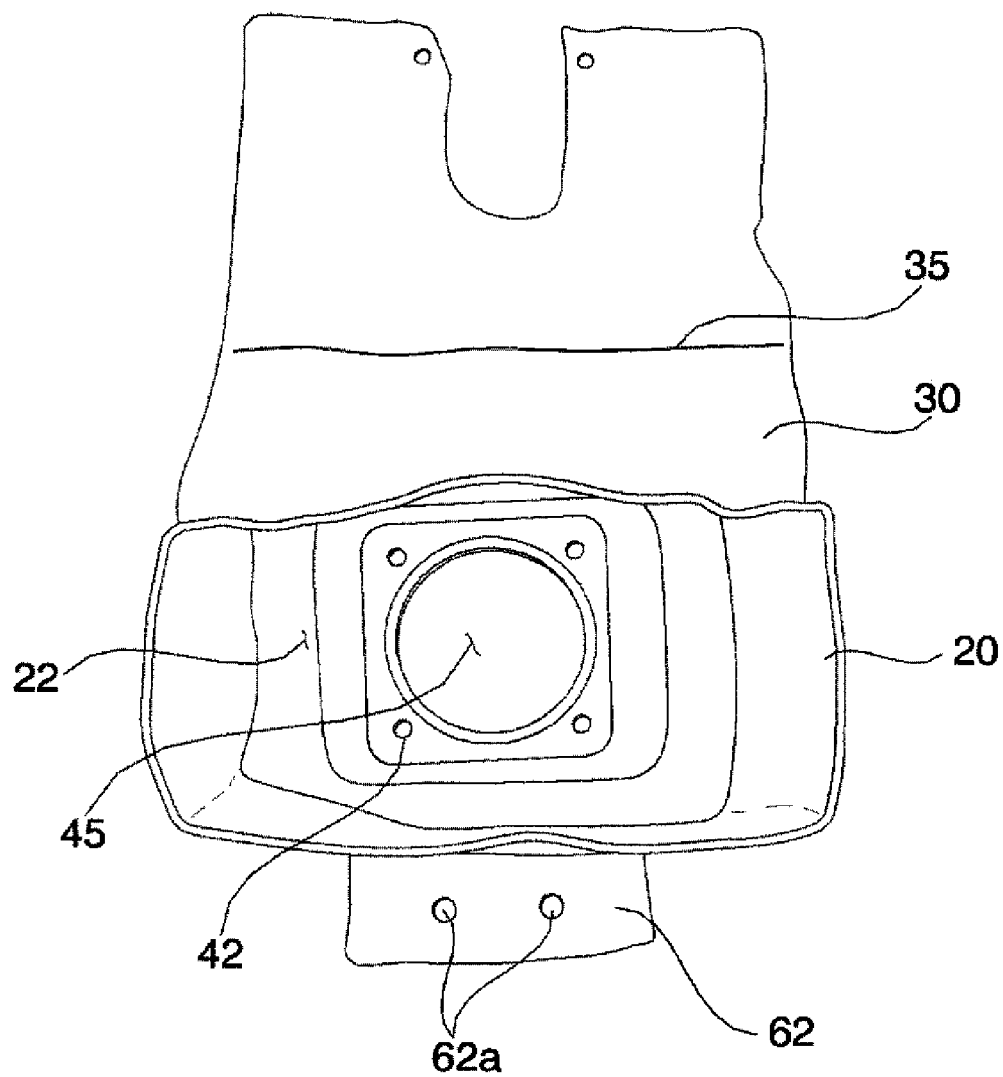
FIG. 3 is a view showing an airbag housing and a cushion cover of the airbag module according to an exemplary embodiment of the present invention, before an airbag cushion is accommodated.
Figure 4:
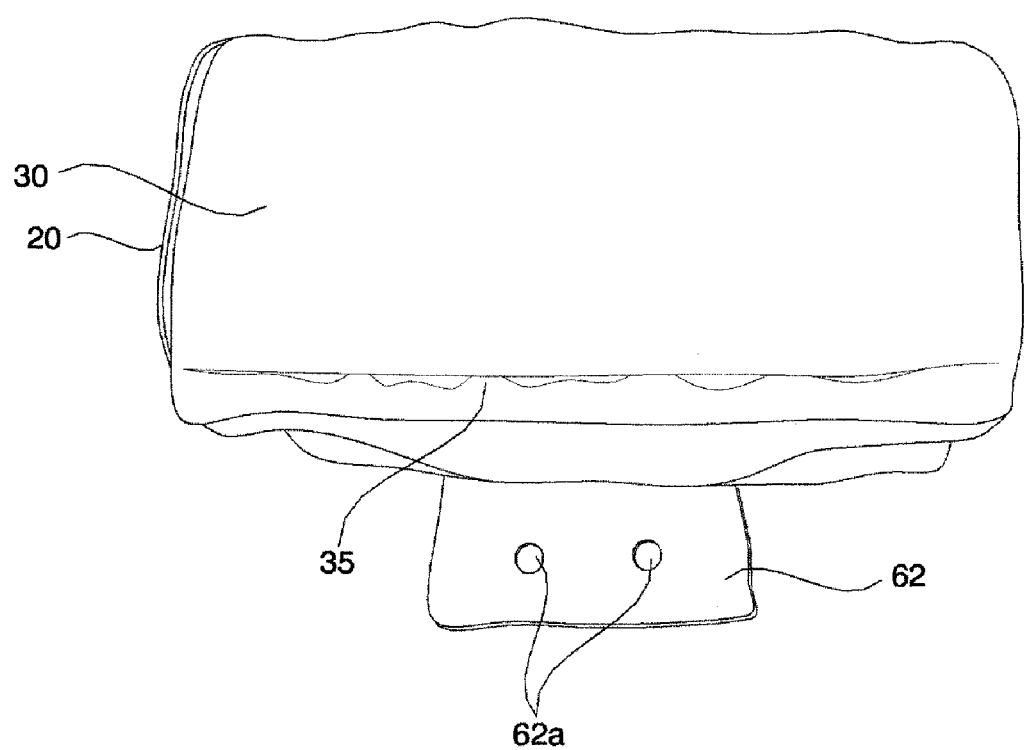
FIG. 4 is a view showing an airbag housing and a cushion cover of the airbag module according to an exemplary embodiment of the present invention, after the airbag cushion is accommodated.
Figure 5:
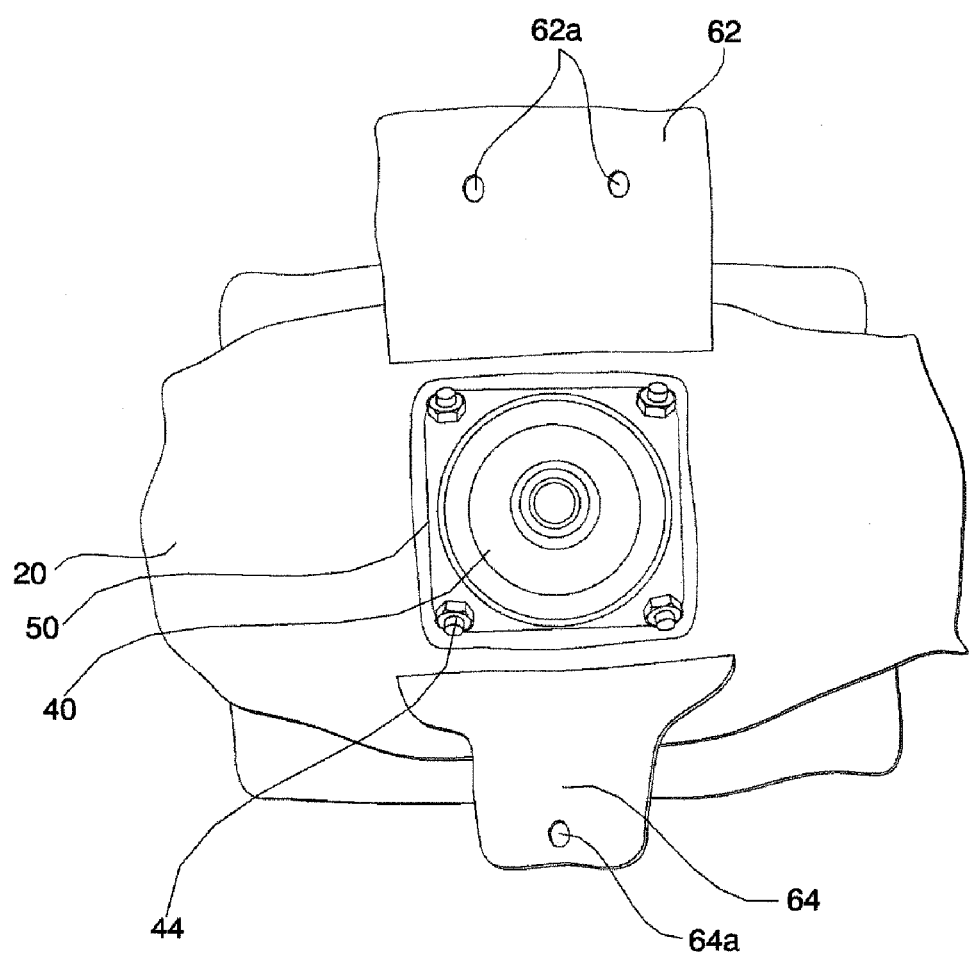
FIG. 5 is a bottom view of the airbag housing of the airbag module according to an exemplary embodiment of the present invention.

FIG. 1 is a perspective view of an airbag module according to an exemplary embodiment of the present invention, FIG. 2 is a cross-sectional view taken along the line A-A of FIG. 1, FIG. 3 is a view showing an airbag housing and a cushion cover of the airbag module according to an exemplary embodiment of the present invention, before an airbag cushion is accommodated, FIG. 4 is a view showing an airbag housing and a cushion cover of the airbag module according to an exemplary embodiment of the present invention, after the airbag cushion is accommodated, and FIG. 5 is a bottom view of the airbag housing of the airbag module according to an exemplary embodiment of the present invention.

Referring to FIGS. 1 to 5, an airbag module according to an exemplary embodiment of the present invention includes an airbag cushion 10 inflated and developed by an inflow gas, an airbag housing 20 accommodating the airbag cushion 10, and a cushion cover 30 disposed on the airbag housing 20.

The airbag cushion 10 is connected with an inflator 40, which is a gas generator, folded several times and accommodated in the airbag housing 20, and inflated and developed through the cushion cover 30 by an inflow of gas generated from the inflator 40, thereby preventing a passenger from hitting the structure of a vehicle and being hurt.

The airbag housing 20 is mounted in a vehicle, with the airbag cushion 10 accommodated therein, and made of a flexible material, for easy weight reduction and design change. The airbag housing 20 is manufactured by coating fabric with silicon to withstand the temperature of the gas in the exemplary embodiment.

The airbag housing 20 made of a flexible material is sewn in a hollow rectangular box shape with a cushion inlet 22 to form the cushion inlet 22 for inserting the airbag cushion 10 at the upper portion, as shown in FIG. 3.

The airbag cushion 10 is folded several times and accommodated in the airbag housing 20 through the cushion inlet 22 at the upper portion of the airbag housing 20.

The inflator 40 supplying a gas into the airbag cushion 10 is mounted at the lower portion of the airbag housing 20.

However, since the airbag housing 20 is made of a flexible material, it may fail to support the inflator 40. Therefore, an inflator support 50 is attached to the bottom of the airbag housing 20 to ensure enough strength to support the inflator 40.

The inflator support 50 is made of a flexible material and sewn to the airbag housing 20. The inflator support 50 is formed by coating strong webbing with silicon to withstand the temperature of the inflator 40 in the exemplary embodiment.

An inflator hole 45 is formed in the inflator support 50 and the airbag housing 20 to insert the inflator 40. Further, bolt holes 42 are formed around the inflator hole 45 in the inflator support 50 and the airbag housing 20.

The inflator 40 is inserted in the inflator hole 45 from under the airbag housing 20, such that the inserted portion is connected with the airbag cushion 10 to supply a gas into the airbag cushion 10 and the other portion, which is not inserted, is fixed with the airbag cushion 10, the airbag housing 20, and the inflator support 50 by tightening the bolts 44 into the bolt holes 42.

Further, since the airbag housing 20 is made of a flexible material, it may be moved up and down by the development pressure of the airbag cushion 10, when the airbag cushion 10 inflates and develops. That is, the airbag cushion 10 is connected with the inflator 40 at the lower portion in the airbag housing 20 and develops upward from the airbag housing 20, when the gas is supplied therein from the inflator 40, in which the airbag housing 20 made of a flexible material may be moved up and down by the development pressure of the airbag cushion 10.

Therefore, a mounting member 60 is combined with the airbag housing 20 to mount and fix the airbag housing 20 in the vehicle. Since the airbag cushion 10 is connected with the inflator 40 at the lower portion in the airbag housing 20, it is preferable to attaché the mounting member 60 to the bottom of the airbag housing 20 to prevent the airbag housing 20 from moving up and down.

The mounting member 60 is made of a flexible material and sewn to the bottom of the airbag housing 20. The mounting member 60 is formed by coating fabric with silicon in the exemplary embodiment.

The mounting member 60 includes a first mounting member 62 attached to the bottom of the airbag housing 20 at one side from the inflator 40 and a second mounting member 64 attached to the bottom of the airbag housing 20 at the opposite side to the first mounting member 62 from the inflator 40. As described above, the mounting member 60 is attached to the bottom of the airbag housing 20 at both sides from the inflator 40; therefore, it is possible to prevent the airbag housing 20 made of a flexible material from sagging due to the weight of the inflator 40.

A hole 62a is formed at the first mounting member 62 and a hole 64a is formed at the second mounting member 64, in order to fasten the mounting members to the vehicle. The holes 62a, 64a each may be one or more. The first mounting member 62 and the second mounting member 64 can be mounted to the vehicle by inserting fasteners in the holes 62a, 64a.

Further, since the airbag housing 20 is made of a flexible material, it may be damaged while inflating together with the airbag cushion 10, due to the inflation force of the airbag 10, when the airbag cushion 10 inflates and develops. Accordingly, a reinforcing member 70 is attached around the airbag housing 20 such that the airbag housing 20 can withstand the inflation force of the airbag cushion 10.

The reinforcing member 70 is made of a flexible material and sewn to the airbag housing 20. The reinforcing member 70 is formed by coating strong webbing with PET (Polyethylene terephthalate) or silicon in the exemplary embodiment.

The reinforcing member 70 includes a horizontal reinforcing member 72 horizontally attached around the airbag housing 20 and a vertical reinforcing member 74 vertically attached around the airbag housing 20. One horizontal reinforcing member 72 is attached around the airbag housing 20 and three vertical reinforcing members 74 are attached around the airbag housing 20 to cross the horizontal reinforcing member 72 in the exemplary embodiment. As described above, the reinforcing member 70 is composed of the horizontal reinforcing member 72 and the vertical reinforcing members 74 such that the sides of the airbag housing 20 are horizontally and vertically reinforced; therefore, the airbag housing 20 can further withstand the inflation pressure of the airbag cushion 10 and the vertical reinforcing members 74 can prevent the airbag housing 20 from being moved up and down by the development pressure of the airbag cushion 10.

The cushion cover 30 is combined to cover the cushion inlet 22 at the upper portion of the airbag housing 20. The cushion cover 30, as shown in FIG. 3, has one end integrally connected with the airbag housing, before the airbag cushion 10 is accommodated in the airbag housing 20. In this status, the airbag cushion 10 is folded several times and inserted into the airbag housing 20 through the cushion inlet 22; thereafter, the other end that is not connected to the airbag housing 20 is connected to the airbag housing 20 to cover the cushion inlet 22, as shown in FIG. 4. Therefore, it is possible to prevent the airbag cushion 10 folded in the airbag housing 20 from inflating before the inflator 40 operates, and also prevent the airbag cushion 10 from coming out of the airbag housing 20.

The cushion cover 30 is made of a flexible material and sewn to the airbag housing 20. The cushion cover 30 is formed by coating fabric with silicon in the exemplary embodiment.

A tear portion 35 is formed by cutting a portion of the cushion cover 30. The tear portion 35, which is a portion through which the airbag cushion 10 inflating comes out, is formed by partially cutting the cushion cover 30 such that the cushion cover 30 is easily torn at the tear portion by the inflation pressure of the airbag cushion 10.

An assembly process of the airbag module having the above configuration according to an exemplary embodiment of the present invention is described below.

First, the airbag housing 20 is fabricated by sewing a raw material such that the cushion inlet 22 and the inflator hole 25 are formed at the upper portion and the lower portion, respectively. The airbag housing 20 may be fabricated by folding a raw material in several layers.

Thereafter, the inflator support 50, the mounting member 60, the reinforcing member 70, and the cushion cover 30 are sewn to the airbag housing 20. In this configuration, the order of sewing the inflator support 50, the mounting member 60, the reinforcing member 70, and the cushion cover 30 to the airbag housing 20 is not limited. Hereafter, it is exemplified that the inflator support 50, the mounting member 60, the reinforcing member 70, and the cushion cover 30 are sewn to the airbag housing 20, in the order of the description.

The inflator hole 55 is formed in the inflator support 50, and then the inflator support 50 is combined with the airbag housing 20 such that the inflator hole 55 is aligned with the inflator hole 25 of the airbag housing 20.

Thereafter, the mounting member 60 is combined with the airbag housing 20 at both sides from the inflator hole 45.

Thereafter, the reinforcing member 70 is attached around the airbag housing 20.

Thereafter, the tear portion 35 is formed in the cushion cover 30 and then one end of the cushion cover 30 is connected to the airbag housing 20, with the other end remaining unconnected.

As described above, a housing assembly is completed by combining the inflator support 50, the mounting member 60, the reinforcing member 70, and the cushion cover 30 with the airbag housing 20.

Thereafter, the airbag module is completed by accommodating the airbag cushion 10 into the housing assembly, combining the inflator 40, and combining the cushion cover 30 with the airbag housing 20 to cover the cushion inlet 22, and this process is as follows.

First, one end of the airbag cushion 10 that is unfolded is inserted into the cushion inlet 22 and connected with the inflator 40 through the inflator hole 45.

Thereafter, the inflator 40 connected with one end of the airbag cushion 10 is partially inserted into the inflator hole 45 and then combined with the airbag cushion 10, the airbag housing 20, and the inflator support 50 by inserting tightening the bolts 44 into the bolt holes 42.

Thereafter, the airbag cushion 10 is inserted into the airbag housing 20 through the cushion inlet 22 while being folded several times.

Thereafter, the other end of the cushion cover 30 which is not connected to the airbag housing 20 is passed over the airbag housing 20 such that the cushion cover 30 covers the cushion inlet 22, and then connected to the airbag housing 10, thereby completing the airbag module.

The airbag module completed as described above is mounted in the instrument panel positioned in front of the passenger seat in a vehicle, in which the mounting member 60 is combined with the cowl cross member disposed in the instrument panel.

A development process of the airbag module having the above configuration according to an exemplary embodiment of the present invention is described below.

First, when a car accident occurs, a gas is generated from the inflator 40 and flows into the airbag cushion 10.

Next, the airbag cushion 10 is inflated and developed by the gas flowing therein from the inflator 40. In the process, the tear portion 35 of the cushion cover 30 is torn by the inflation pressure of the airbag cushion 10 and the airbag cushion 10 comes out through the tear portion 35 and develops to protect a passenger.

As described above, since all of the airbag housing 20, inflator support 50, mounting member 60, reinforcing member 70, and cushion member 30 is made of a flexible material, it is possible to reduce weight and easily change design of the airbag module according to an exemplary embodiment of the present invention.

Further, since the airbag housing 20 and the cushion cover 30 are integrated, it is possible to easily maintain the parts and also simplify the assembly process.

While certain embodiments have been described above, it will be understood to those skilled in the art that the exemplary embodiments described are by way of example only. Accordingly, the apparatus described herein should not be limited based on the described embodiments. The scope of the present invention is defined in the following claims and all changed or modified types derived from the meanings and scope of the claims and the equivalent concept thereof should be construed as being included in the scope of the present invention.

What is claimed is:

1. An airbag module comprising:
    an airbag cushion inflated and developed by an inflow gas;
    an airbag housing having a cushion inlet through which the airbag cushion is inserted, accommodating the airbag cushion inserted through the cushion inlet, and made of a flexible material;
    a cushion cover combined with the airbag housing to cover the cushion inlet and made of a flexible material; and
    a reinforcing member attached around the airbag housing such that the airbag housing withstands the inflation pressure of the airbag cushion.

2. The airbag module according to claim 1, wherein at least one of the airbag housing and the cushion cover is made of a material including fabric.

3. The airbag module according to claim 1, wherein a tear portion is formed by cutting a portion of the cushion cover to be torn by inflation pressure of the airbag cushion, when the airbag cushion inflates and develops.

4. The airbag module according to claim 1, wherein the reinforcing member includes:
    a horizontal reinforcing member horizontally attached around the airbag housing; and
    a vertical reinforcing member vertically attached around the airbag housing.

5. The airbag module according to claim 1, wherein the reinforcing member is made of a flexible material.

6. The airbag module according to claim 5, wherein the reinforcing member is made of a material including fabric.

7. The airbag module according to claim 1, further comprising:
    an inflator supplying a gas into the airbag cushion; and
    an inflator support combined with the airbag housing and supporting the inflator.

8. The airbag module according to claim 7, wherein the inflator support is made of a flexible material.

9. The airbag module according to claim 8, wherein the inflator support is made of a material including fabric.

10. An airbag module comprising:
    an airbag cushion inflated and developed by an inflow gas;
    an airbag housing having a cushion inlet through which the airbag cushion is inserted, accommodating the airbag cushion inserted through the cushion inlet, and made of a flexible material;
    a cushion cover combined with the airbag housing to cover the cushion inlet and made of a flexible material: and
    a mounting member combined with the airbag housing to be mounted in a vehicle and restraining movement of the airbag housing due to development pressure of the airbag cushion, wherein the mounting member is made of a flexible material.

11. The airbag module according to claim 10, further comprising an inflator supplying a gas into the airbag cushion, wherein the mounting member includes:
   a first mounting member attached to the bottom of the airbag housing at one side from the inflator; and
   a second mounting member attached to the bottom of the airbag housing at the opposite side to the first mounting member from the inflator.

12. The airbag module according to claim 11, wherein the mounting member is made of a material including fabric.

* * * * *